(12) United States Patent
Sternowski

(10) Patent No.: US 9,742,448 B1
(45) Date of Patent: *Aug. 22, 2017

(54) CHANNELIZED MULTICARRIER DIGITIZER

(71) Applicant: Softronics, Ltd., Marion, IA (US)

(72) Inventor: Robert Sternowski, Cedar Rapids, IA (US)

(73) Assignee: Softronics, Ltd., Marion, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/401,417

(22) Filed: Jan. 9, 2017

Related U.S. Application Data

(63) Continuation of application No. 13/342,427, filed on Jan. 3, 2012, now Pat. No. 9,577,855.

(60) Provisional application No. 61/507,351, filed on Jul. 13, 2011.

(51) Int. Cl.
*H04B 1/10* (2006.01)
*H04B 1/18* (2006.01)
*H04B 1/04* (2006.01)

(52) U.S. Cl.
CPC ......... *H04B 1/1018* (2013.01); *H04B 1/0475* (2013.01); *H04B 1/18* (2013.01); *H04B 2001/0416* (2013.01)

(58) Field of Classification Search
CPC ......... H04L 5/06; H04L 27/00; H04B 1/1018; H04B 1/0475; H04B 1/18; H04B 2001/0416
See application file for complete search history.

(56) References Cited

U.S. PATENT DOCUMENTS

| | | | | |
|---|---|---|---|---|
| 5,590,156 | A | * 12/1996 | Carney | H04B 1/109 375/316 |
| 5,745,846 | A | * 4/1998 | Myer | H04B 1/28 330/126 |
| 6,216,100 | B1 | 4/2001 | Meghdadi et al. | |
| 6,256,485 | B1 | 7/2001 | Heard | |

(Continued)

OTHER PUBLICATIONS

Yi-De Liu, An Efficient Iterative Algorithm for Finding the Minimum Sampling Frequency of Multiple Bandpass Signals, Aug. 18, 2009.

(Continued)

*Primary Examiner* — Patrick Edouard
*Assistant Examiner* — Eboni Hughes
(74) *Attorney, Agent, or Firm* — Shuttleworth & Ingersoll, PLC; Jason Sytsma

(57) ABSTRACT

A method is provided for individually processing multiple frequency bands in a composite RF signal is disclosed. The composite RF signal is separated into a plurality of gain controlled and bandlimited frequency bands. The gain controlled and bandlimited frequency bands are then recombined to produce a controlled composite RF signal, which is then digitized by undersampling with an ADC to produce a plurality of unambiguous frequency bands convolved around baseband. The sample frequency can be substantially less than the Nyquist Limit of twice the highest frequency present for digitization. Each baseband signal is monitored for amplitude spikes therein. In response to an amplitude spike, the appropriate frequency band is modified by a control signal to hold the ADC to within its dynamic range.

20 Claims, 6 Drawing Sheets

(56) References Cited

U.S. PATENT DOCUMENTS

| | | |
|---|---|---|
| 7,539,474 B2 | 5/2009 | Sorrels et al. |
| 7,869,528 B2 * | 1/2011 | Robinson ............. H04B 1/0483 375/146 |
| 7,937,059 B2 | 5/2011 | Sorrells et al. |
| 8,693,584 B1 * | 4/2014 | Sternowski ......... H04L 27/2647 375/340 |
| 2003/0021367 A1 * | 1/2003 | Smith .................... H04B 1/123 375/346 |
| 2006/0146944 A1 | 7/2006 | Chiu |
| 2006/0165198 A1 * | 7/2006 | Tietjen ................ H04L 27/3845 375/331 |
| 2009/0196385 A1 | 8/2009 | Hunter et al. |
| 2009/0221257 A1 * | 9/2009 | Sorrells ................... H03D 7/00 455/313 |
| 2010/0156815 A1 * | 6/2010 | Silberman ............. G06F 3/0236 345/173 |
| 2010/0202566 A1 | 8/2010 | Fudge et al. |
| 2012/0190317 A1 * | 7/2012 | Martineau ................ H01P 5/12 455/103 |

OTHER PUBLICATIONS

Hittite Microwave Corporation product data sheet, High Speed Logic-SMT, Hittite Microwave Corporation, Chelmsford, MA.

\* cited by examiner

SIGNAL MODIFIER 118

| | Bd | MIN | MAX | BW |
|---|---|---|---|---|
| 1 | 1 | 698.000 | 716.000 | 18.000 |
| 2 | 2 | 776.000 | 790.000 | 14.000 |
| 3 | 3 | 806.000 | 849.000 | 43.000 |
| 4 | 4 | 880.000 | 915.000 | 35.000 |
| 5 | 5 | 1850.000 | 1910.000 | 60.000 |
| 6 | 6 | 1920.000 | 1980.000 | 60.000 |
| 7 | 7 | 1710.000 | 1785.000 | 75.000 |
| 8 | 8 | 2500.000 | 2570.000 | 70.000 |
| 9 | 9 | 1600.000 | 1660.000 | 60.000 |

*FIG. 3*

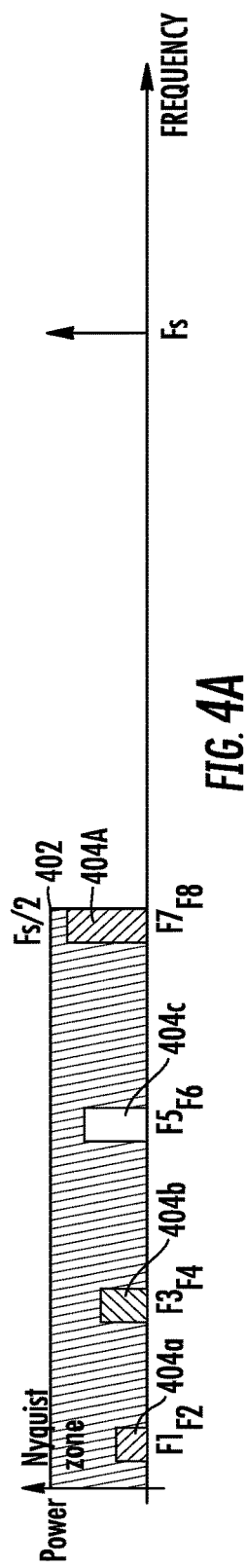
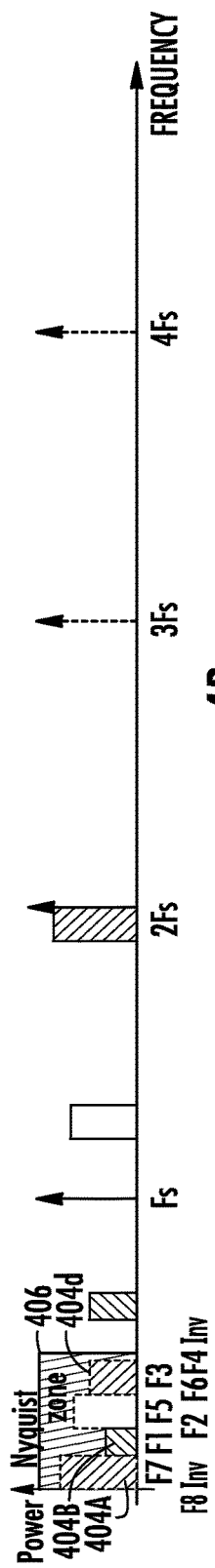
FIG. 4A
FIG. 4B

CHANNELIZED MULTICARRIER DIGITIZER

This application is a continuation of application Ser. No. 13/342,427 filed Jan. 3, 2012 which application claims priority to U.S. Provisional Patent Application 61/507,351 filed Jul. 13, 2011, both of which applications are incorporated by reference herein.

BACKGROUND OF THE INVENTION

Most traditional radio architectures operate on a single band or range of frequencies. There are many applications, however, where multiple bands need to be monitored. For example, in radio surveillance the entire spectrum may need to be monitored because content is spread throughout the spectrum on individual frequency bands. Where such wideband monitoring is required, the norm is to utilize multiple radios, each designed to operate in one specified band, or use a wideband digitizer with an analog to digital converter (ADC) sufficient to the task. When attempting to operate a wideband digitizer in a dense signal environment, however, the ADC can very easily be driven past its dynamic range by a momentary power spike in any one of the signals. When this happens all the signal content is lost until the ADC and subsequent digital signal processing (DSP) recovers from the ADC overload. Alternatively, a momentary power spike in any one of the stronger signals could overpower and drown out a weaker signal, which may contain important content.

The resolution of the ADC determines the dynamic range of the radio receiver, and the current state of the art for ADCs is simply insufficient to digitize, for example, a 0-3 GHz spectrum, the bandwidth on which all the relevant cellular communication resides, because sampling the spectrum would require a 6 GHz sampling frequency, well beyond the current state of the art.

The current state-of-the-art performance of an ADC has a 12 to 16 bit resolution at 3 GHz to 500 MHz clock rates, respectively, corresponding to a dynamic range of approximately 74 db to 98 db, respectively. This, however, is merely the theoretical dynamic range; in reality it is 6 db or less due to implementation inefficiencies. Radios typically require a dynamic range of 100 to 150 db, corresponding to a lower limit of approximately 17 bits and an upper limit of 25 bits, with the nominal required performance somewhere in the middle at 21-22 bits resolution. Such ADCs do not exist today.

Therefore, a solution is needed to reduce the size and the number of ADCs necessary for wideband digitization.

SUMMARY

According to one embodiment, there is provided a circuit for individually processing multiple frequency bands in a composite RF signal. The circuit comprises a power splitter connected to an antenna to receive a composite RF signal and split the signal into a plurality of composite RF signals of substantially equal power. The composite RF signals are directed to a bank of signal modifiers each configured to isolate a frequency band of interest. A power combiner receives the output signal from each of the signal modifiers and combines the outputs into a signal controlled composite RF signal. The controlled composite RF signal is then digitized by a digital-to-analog converter (ADC).

The ADC is configured to convolve the individual bands within the controlled composite RF signal to baseband. The ADC samples the controlled composite RF signal with a sample frequency $F_S$ that is less than twice the bandwidth of the composite RF signal.

A controller responsive to the ADC compares the amplitude for each of the baseband signals with a predefined value. In the event the amplitude of one of the baseband signals exceeds the predefined value, the controller is configured to send a control signal to the appropriate signal modifier to reduce the gain in the corresponding baseband signal.

In another embodiment, a method for individually processing multiple frequency bands in a composite RF signal is disclosed. The composite RF signal is separated into a plurality of gain controlled and bandlimited frequency bands. The gain controlled and bandlimited frequency bands are then recombined to produce a controlled composite RF signal, which is then digitized by undersampling with an ADC to produce a plurality of frequency bands convolved around baseband. Each baseband signal is monitored for amplitude spikes therein. In response to an amplitude spike, the appropriate frequency band is modified by a control signal. This holds the ADC within its dynamic range.

In yet another embodiment, there is provided another circuit for individually processing multiple frequency bands in a composite RF signal. The circuit comprises a digital-to-analog converter (DAC) to convert a digital signal having a plurality of individual band signals into a composite RF signal. A power splitter splits the composite RF signal into a plurality of composite RF signals of substantially equal power. A plurality of signal modifiers are each configured to isolate a frequency band of interest. A transmitter amplifier then recombines the frequency bands from each of the signal modifiers into a controlled composite RF signal. A controller compares each of the plurality of individual band signals to the DAC with a corresponding predefined value. In response to a band signal exceeding the predefined value, the controller is configured to provide a control signal to the control node of the appropriate signal modifier to modify the band within the controlled composite RF signal corresponding to the band signal of interest.

In another implementation of channelized multicarrier transmitter system 200, the output of each signal modifier 206 is received by a separate transmitter amplifier 202 with each multicarrier signal S1 to Sn transmitted on its own antenna.

BRIEF DESCRIPTION OF THE DRAWINGS

FIG. 3 is a look-up table from FIG. 1 illustrating a correlation between the signal modifiers and the frequency bands.

FIG. 4a is a chart showing a Nyquist zone determined by prior art methods for a wide bandwidth spectrum.

FIG. 4b is a chart showing a Nyquist zone determined by the system shown in FIG. 1.

DETAILED DESCRIPTION OF THE ILLUSTRATED EMBODIMENTS

Figure 1:
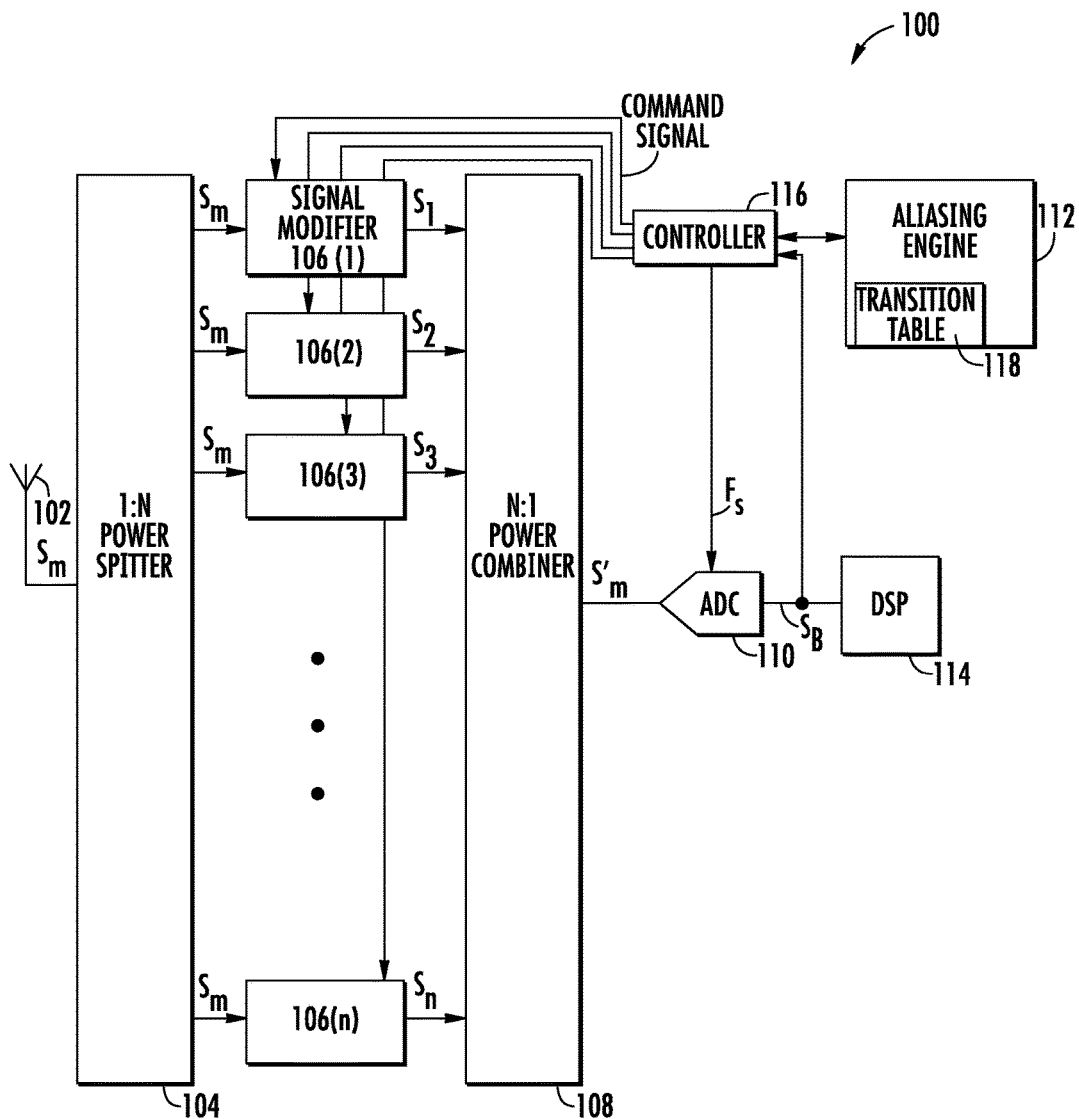
FIG. 1 is a block diagram of a channelized multicarrier receiver system formed in accordance with an embodiment of the present invention.

Disclosed is a means for reducing the performance and number of analog-to-digital converters (ADCs) necessary for wideband digitization of a signal spectrum of interest. An ADC converts a continuous time signal to a discrete time signal and the reverse operation is performed by a digital-to-analog converter (DAC). The disclosure is within the context of an ADC as used in a receiver with the understanding that the DAC as used in a transmitter has a similar operation. The resolution of the ADC indicates the number of discrete values it can produce over the range of analog values, and is typically expressed in bits. The sample rate (also referred to herein as the sampling frequency, clock rate, or clock frequency) of the ADC determines the maximum frequency it can digitize. This maximum frequency corresponds to the well-known Nyquist Sampling Theorem, which simply states that to unambiguously create a useful digital sample stream, one must sample a signal at a sample rate no less than twice the frequency of the signal (or the highest signal in a group of signals to be digitized simultaneously). This may be interpreted, and applied, to either the highest frequency, or the bandwidth of the signal to be digitized regardless of its absolute frequency.

The input bandwidth of the ADC determines the highest frequency signal that will be digitized. The input bandwidth must at least equal at least the highest absolute frequency to be digitized, regardless of total bandwidth or sampling frequency (for both undersampling and oversampling cases). To the extent that the sampling frequency is less than the required Nyquist rate for unambiguously digitizing the absolute frequencies of the desired signals, aliasing ambiguity will occur resulting in a loss of information. But, if the individual frequency band signals within the spectrum of interest can be can be down converted to base band and contiguously positioned, the effective bandwidth of the desired signals is decreased. Effectively, the desired bands have been "compacted" by removing the spectral bands between bands of interest through the convolution process. To the extent that the sampling frequency is greater than or equal to the required Nyquist rate for sampling the contiguous base band signals, the Nyquist Theorem is satisfied allowing for the content to be sufficiently reproduced.

Undersampling is the technique required to down convert the individual frequency band signals within the spectrum of interest to base band. Undersampling effectively equals mixing a higher frequency signal (greater than the Nyquist limit) down to baseband, or an intermediate frequency band centered at zero frequency. This means that it is possible to produce baseband replicas of the individual frequency band signals within the spectrum and digitize these baseband replicas to derive the content across all the frequency bands within the spectrum of interest. All that is required is knowing the bands of interest within the spectrum that is being observed and the appropriate sampling frequency.

Undersampling in the above manner also convolves all the undesired frequency bands, between the desired bands, to baseband, potentially overlapping the desired bands and causing degradation or loss of information by introducing undesired energy into the desired bands. Thus it is necessary to attenuate or filter out undesirable signals and noise from the spectrum of interest. If not attenuated or removed, these undesirable signals may intermix with the desired signals after sampling or may consume a portion of the ADC's available dynamic range.

The required performance of the ADC can be further reduced by dynamically attenuating the power level of the individual bands. The ADC is constrained to operate within its dynamic range by separating the individual bands so power spikes within any one frequency band can be individually suppressed before the power spikes drive the ADC beyond its dynamic range. This means the ADC does not need to be over-specified to anticipate the power spikes.

FIG. 1 shows a first embodiment of a channelized multicarrier receiver system 100. The system 100 is operable to separate and control the power level (i.e. the gain or attenuation) of each one of a plurality of carrier signals S1 to Sn and then to recombine and digitize by down-converting the multicarrier signals S1 to Sn to baseband for digital signal processing. The power level control allows the multicarrier signals S1 to Sn to be applied to a limited dynamic range analog-to-digital converter (ADC) for continuous digitization of the spectrum with individual dynamic gain control for each one of the multicarrier signals S1 to Sn to limit signal interruption of the signal of interest.

The carrier signals S1 to Sn residing in a spectrum of interest, each of which may occupy a different frequency band within a wider, allocated frequency range, are received by an antenna 102 where they are effectively combined to form a multicarrier signal Sm. By way of example, each of the frequency bands contains a multiplicity of like cellular signals allotted to various service providers. The 802-824 MHz band is an IDEN network that Nextel uses, the 824-849 MHz band is a GSM network that AT&T uses, the 906-928 MHz band is an ISM public band, the 1750-1784 band is a GSM network, 1850-1884 MHz is a PCS network, the 1920-1980 band is a UMTS network, and the 2500-2570 band is a WIMAX network. Each these frequency bands, corresponding to carrier signals S1 to Sn, produces the vector sum of all signals present across all of the bands when they are received by antenna 102. Furthermore, the power levels of each of the signals S1 to Sn may differ widely by the time they reach the antenna 102, as, for example, in cellular communications where each signal originates from a mobile user at a different location. These power variations are substantially compensated for by receiving system 100 that isolates and controls the received power levels of each carrier to enable efficient digital signal processing to follow.

The multicarrier signal Sm received at antenna 102 is split into N electrical paths by a 1:N power splitter 104, with the multicarrier signal Sm in each one of the N paths applied to a signal modifier circuit 106. Power splitter 104 can be any conventional signal splitting component, including a passive or active component, or frequency selective network, provided it has a controlled impedance, which is 50 ohms for radio systems.

A unique aspect to system 100 is the lack of preconditioning filter and amplifier between antenna 102 and power splitter 104. In prior art RF receivers, a low pass or band pass filter is tuned for a pass band corresponding substantially to the allocated frequency range for S1 to Sn. The filter is followed by a low noise amplifier (LNA) to enhance noise figure performance of the remaining circuitry in the receiver. Instead, system 100 has signal modifier 106 following power splitter 104 that eliminates the need for such preconditioning signal components, thus avoiding the risk of overload and distortion of said amplifier due to exposure to the uncontrolled bandwidth of the composite antenna signal.

The bank of n signal modifiers 106 splits multicarrier signal Sm into separate bandlimited carrier signals S1 to Sn. Each signal modifier 106 operates to control the gain and filter out one of the carrier signals S1 to Sn. The resulting output of signal modifier 106(a)-(n) corresponds to a unique bandlimited carrier signal S1 to Sn, which signals may have equal or unequal bandwidth or even weighted bands. A bandlimited signal is one which has negligible out-of-band leakage. The out-of-band leakage is proportional to the sampling frequency in that the better suppression of the out-of-band leakage, the lower the sampling frequency required to unambiguously convolve the individual signals to base band, which will be discussed in detail below.

Figure 2:
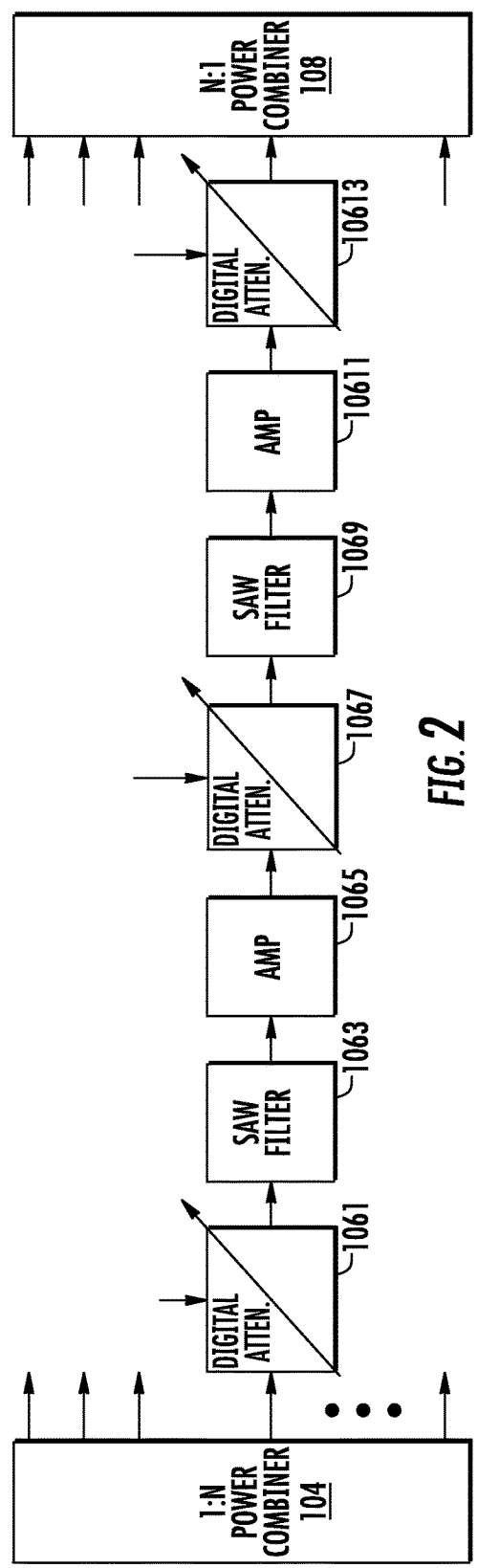
FIG. 2 is a block diagram of a signal modifier found in the channelized multicarrier receiver system of FIG. 1.

The carrier signals S1 to Sn are isolated from multicarrier signal Sm by means of a combination of low-cost, low-loss surface acoustic wave filters ("SAW filter"), digital attenuators, and amplifiers to control the gain and attenuation and band-limit the output signal. The SAW filters convert an electrical signal into a mechanical wave. The surface wave propagates across the device where it is converted back to an electrical wave. The SAW filter delays the output signal by time ($\tau$) and increases the stopband attenuation to produce a finely tuned bandlimited signal with negligent out of band leakage. The digital attenuators reduce the gain of the signal to keep the maximum signal applied to the amplifier below the amplifier's threshold. The digital attenuators are sequenced to reduce the gain in steps, in order to prevent overload of the amplifiers. The digital attenuators in the preferred embodiment have a 1,000:1 attenuation and respond sequentially to a command signal provided by controller 116. The amplifiers, on the other hand, increase the gain of the signal. The amplifiers, in the preferred embodiment, are constant gain amplifiers with a 10:1 gain. The number and arrangement of amplifiers, filters, and attenuators is established by cascade noise and intermodulation analysis techniques, and any arrangement of RF band pass filters can be used so long as they provide sufficient out-of-band attenuation. FIG. 2 shows signal modifier 106. Beginning with digital attenuator 1061, multicarrier signal Sm is attenuated before being bandlimited by SAW filter 1063. Digital attenuator 1061 is positioned ahead of SAW filter 1063, because the RF circuitry requires a controlled 50 ohm impedance and SAW filter 1063 only has a 50 ohm impedance in its pass band. Outside its pass band, SAW filter 1063 has an uncontrolled impedance. The output of SAW filter 1063 is amplified by amplifier 1065 then the signal is attenuated by digital attenuator 1067. A second SAW filter 1069 further band-limits the signal followed by further amplification by amplifier 10611 and attenuation by digital attenuator 10613. The resulting output of digital attenuator 10613 is a gain controlled bandlimited carrier signals S1 to SN. The number of amplifiers, filters, and attenuators can be adapted for various implementations.

The gain controlled, bandlimited carrier signals S1 to Sn corresponding to the N paths are applied to an N:1 power combiner 108 where they are combined into a controlled composite RF output signal S'm that appears at the input of an analog to digital converter (ADC) 110. Power combiner 108 can be any conventional signal combining component, including a passive or active component, or frequency selective network, provided it has a controlled impedance, which is 50 ohm for radio systems.

The gain controlled, bandlimited carrier signals S1 to Sn from corresponding signal modifiers 106a to 106n are at different frequencies and are summed as composite RF output signal S'm for digital down conversion to base band by ADC 110. ADC 110 is a readily available commercial off-the-shelf component constrained to operating within a limited dynamic range. Because composite RF output signal S'm comprises multiple gain controlled, bandlimited carrier signals S1 to Sn, which are constrained to operate within the dynamic range of ADC 110, a momentary power spike in any one of carrier signals S1 to Sn is immediately suppressed by system 100 to preserve the integrity of the weaker carrier signals S1 to Sn that make up composite RF output signal S'm.

ADC is driven by a clock frequency $F_S$ where $F_S$ is calculated by aliasing engine 112. Aliasing engine 112 is programmed with software operable to calculate $F_S$ by iteratively incrementing a frequency F for a given set of frequency bands corresponding to carrier signals S1 to Sn and convolve the given set of frequency bands to baseband in order to test for ambiguity and fold over in the frequency bands. The iterative process continues until values for $F_S$ are found that down covert carrier signals S1 to Sn into a plurality of unambiguous individual base band signals.

As stated above, the clock frequency $F_S$ is a sampling frequency that is used to down convert carrier signals S1 to Sn to baseband by undersampling composite RF output signal S'm. This can have the effect of simultaneously oversampling the down converted individual base band signal when the clock frequency $F_S$ is greater than the total bandwidth of carrier signals S1 to Sn. The sampling frequency is effectively equal to, or greater than, twice the total bandwidth of carrier signals S1 to Sn and preferably much less than the Nyquist sampling frequency required for sampling the highest frequency component of the composite RF output signal S'm. Sampling more than twice the total bandwidth of carrier signals S1 to Sn leaves margin to use less expensive baseband aliasing filters.

By aliasing carrier signals S1 to Sn of composite RF output signal S'm with a sampling frequency $F_S$, the system 100 down-converts the carrier signal S1 to Sn to lower frequencies positioned around baseband. Even though the carrier waves of composite RF output signal S'm may be aliased, the Nyquist criteria for the frequency content within carrier signals S1 to Sn is satisfied and as a result, the content can be sufficiently reproduced.

FIG. 4a shows a Nyquist zone 402 for digitizing four widely separated bands 404a-404d in the conventional manner, as known in the prior art. The entire spectrum must be digitized since signals may be present anywhere between bands 404a-404d. If, for example, bands 404a-404d represent the cellular spectrum, i.e. 30-3000 MHz, there is no alternative to digitizing this band other than to sample at a minimum sampling frequency of 6 GHz (i.e., 2×3000 MHz, which is the highest frequency to be received), which would require an expensive state of the art ADC.

FIG. 4b illustrates undersampling. In this example, bands 404a-404d have been aliased at a sampling frequency $F_S$ to produce four distinct contiguous unambiguous individual base band signals 404a-404d at 25% the sampling frequency $F_S$. All four of the desired bands are present in the baseband Nyquist zone, without interfering overlap. The degree of interfering overlap may be controlled by selection of the sample frequency, e.g., the exact baseband frequency convolution of each band varies proportionally to the sample frequency in a complex mathematical pattern. The net effect of system 100, comparing FIG. 4(a) to FIG. 4(b), is that only the desired bandwidth is digitized, as opposed to all the unneeded bandwidth, which makes ADC 110 four times as efficient, because it is running at 25% of the sampling frequency of the conventional prior art device, shown in FIG. 4(a). Given that power consumption, heat, and cost of digital components generally vary as the square of the clock speed, this is a considerable savings.

To find the lowest possible sampling frequency $F_S$ for a given set of frequency bands, one may use any conventional mathematical approach, such as a highly complex network solution of simultaneously equations. More simply, however, an aliasing engine 112 running computer software to iteratively increment a frequency F for sampling a given set of frequency bands and testing the undersampled frequency bands for overlap and fold-over until the sampling frequencies are found that unambiguously convolve the individual signals to baseband. The lowest $F_S$ possible will be equal to 2*sum(frequency bandwidths), which would be a perfect case where the desired frequency bands are contiguous.

The iterative process for finding the lowest possible sampling frequency $F_S$ begins with frequency F as twice the total bandwidth of the bands being sampled, which is the absolute minimum sample clock frequency that can work, per the Nyquist sampling theorem. The sampled bands are convolved to baseband using frequency F so the bands can be tested for: (1) fold-over of any of the sampled bands at baseband (0 Hz frequency) or at frequency F; and (2) overlapping of any of the sampled bands. If the fold-over-free and overlap-free criteria are not met, then frequency F is incremented by a predetermined amount and the fold-over and overlap criteria analyzed at the new frequency F. This process continues until a fold-over-free and overlap-free test frequency F is found. In some instances there may be multiple solutions, in which case the lowest such frequency is generally regarded as the best choice. In the worst-case, there may not be a solution, in which case the traditional Nyquist Sampling Theorem of twice the highest frequency is used. In an alternative embodiment, a set of simultaneous equations may be constructed to yield an exact solution to the lowest possible sample clock frequency for a set of bands.

Aliasing engine 112 with software necessary to carry out the above process, can reside within system 100 or, alternatively, reside separately therefrom and be used merely to calculate $F_S$, which is then programmed into controller 116. In the preferred embodiment, aliasing engine 112 carries out the process of iteratively incrementing F using preprogrammed macros within a Microsoft Excel® spreadsheet.

Aliasing engine 112 may also be programmed with rules to specify a minimum band spacing between baseband frequency bands 404a-404d, and may optionally allow overlap of selected bands. These constraints correspond to the attenuation and frequency response curves of realizable band-limiting filters that are required ahead of ADC 110 for each band to be digitized, while preventing out-of-band undesired signals from reaching ADC 110 and generating interference.

The distinct unambiguous individual base band signals 404a-404d can be collectively or individually processed by a digital signal processor 114 in the conventional manner. The resulting digital input Digital Signal Processor (DSP) 114 is monitored by a controller 116 for power spikes within baseband signals 404a-404d and dynamically responds to modify the appropriate carrier signal S1 to Sn by controlling the corresponding signal modifier 106 to keep the resulting output of ADC 110 within its dynamic range. A signal of interest within baseband signals 404a-404d, in some instances, is weaker than the other signal. System 100 controls the power level of carrier signals S1 to Sn in order to prevent a weaker signal of interest from being overpowered by stronger signals or destabilizing the receiver when peak envelop power is exceeded.

Controller 116 employs a time-to-frequency domain conversion on the output signal of ADC 110 combined with automatic gain control of signal modifiers 106. In an embodiment, controller 116 is a field-programmable gate array (FPGA) that receives continuous samples from ADC 110 and does a periodic fast Fourier transform (FFT). A look-up table 118 residing on aliasing engine 112 or controller 116 allows controller 116 to quickly identify the offending carrier signal S1 to Sn and to send an attenuation command signal to the appropriate signal modifier 106.

FIG. 3 shows look-up table 118 residing on aliasing engine 112. Look-up table 118, in the illustrated embodiment, associates nine signal modifiers with nine signal bands, wherein each signal band has a corresponding frequency range. Controller 116 can quickly compare a frequency or band of interest with look-up table 118 to determine the appropriate signal modifier to receive an attenuation command signal.

Controller 116 can also allocate gain to carrier signals S1 to Sn in order of importance. The most important channel will be amplified followed by the second and so on, and so forth until the dynamic range of the ADC 110 is reached. This way the most important signals are boosted and the least important signals are attenuated.

System 100 is equally applicable to a transmitter or a transceiver communication system. In a multicarrier transmitter such as a telephone microwave system it is often desirable to have gain control over the transmit carrier signals S1 to Sn. This has several desirable effects, such as ensuring every receiver receives a signal that has the same power level, or prioritizing carrier signals S1 to Sn so high priority signals are amplified.

Figure 5:
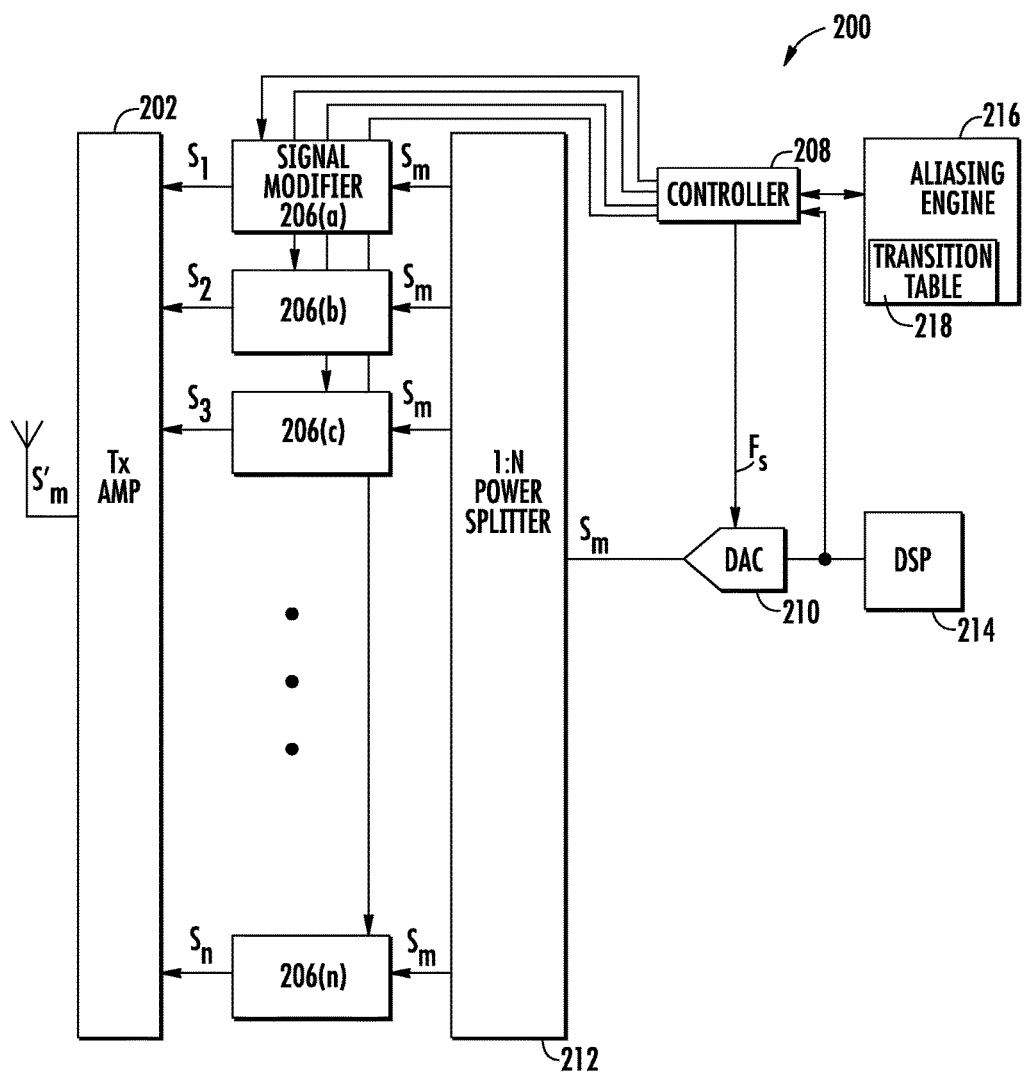
FIG. 5 is a block diagram of a channelized multicarrier transmitter system formed in accordance with an alternative embodiment of the present invention.

FIG. 5 shows a channelized multicarrier transmitter system 200. The system 200 is operable to control the power level of a plurality of carrier signals S1 to Sn to within a predetermined range and transmit those signals. The power level control provides gain control of the multicarrier signals S1 to Sn before they are applied to a limited dynamic range transmitter amplifier 202. Signal modifiers 204 operate to control the gain and band-limit the carrier signal S1 to Sn. The bank of n signal modifiers 204 subdivide multicarrier signal Sm into separate carrier signals S1 to Sn, which may have equal or unequal bandwidth or even weighted bands. In this regard, signal modifiers 204 operate in the same manner as signal modifiers 106 in system 100.

Signal modifiers 204 in system 200 are controlled by controller 208, which is functionally equivalent to controller 116 in system 100. Controller 208 monitors the output of an DAC 210 for power spikes within the baseband signals and dynamically responds to attenuate or amplify the appropriate carrier signal by controlling the corresponding signal modifier 204 to keep the resulting output of transmitter amplifier 202 within its dynamic range.

DAC 210 is driven by DSP 214 with a multi-band sample stream that is mixed with a clock frequency $F_S$ to produce multicarrier signal Sm, which is then split into n equal paths by a power splitter 212. $F_S$ is calculated by an aliasing engine 216 in the same manner as in system 100. A look-up table residing in aliasing engine 216 or controller 208 allows controller 208 to quickly identify carrier signal S1 to Sn of interest and send an attenuation command signal to the appropriate signal modifier 206.

In an alternative embodiment of channelized multicarrier transmitter system 200, the output of each signal modifier 206 is received by a separate transmitter amplifier 202 with each multicarrier signal S1 to Sn transmitted on its own antenna.

Figure 6:
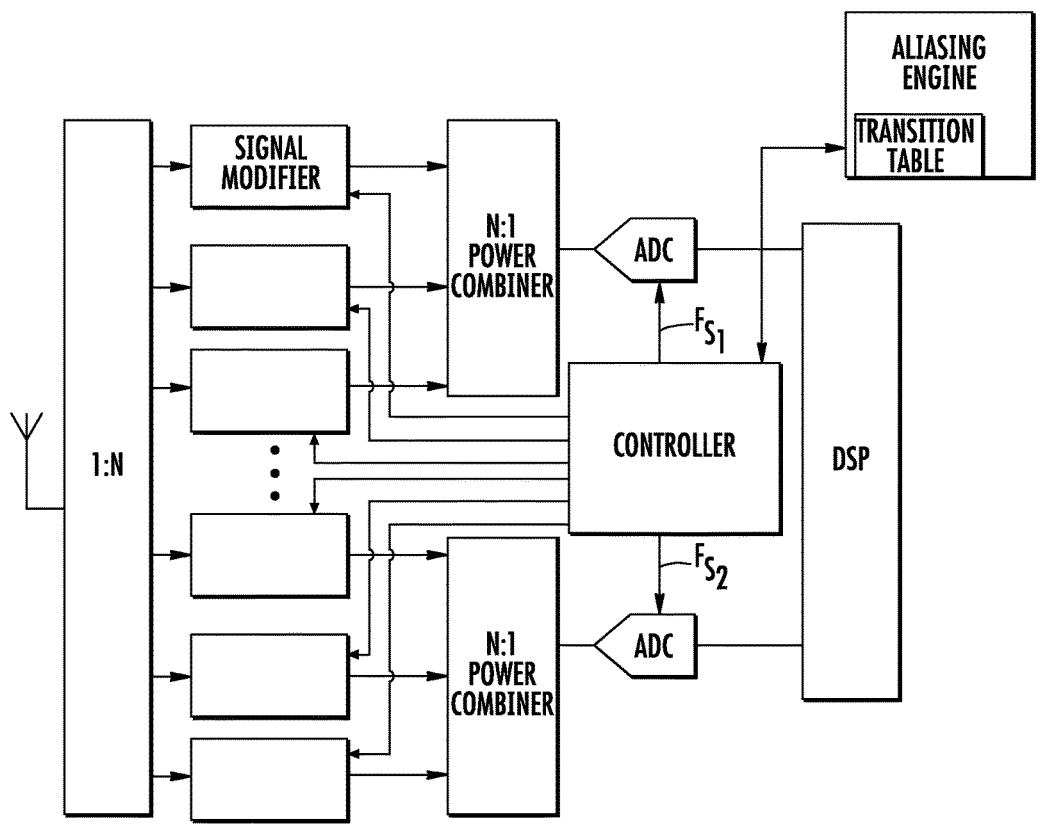
FIG. 6 is a block diagram of a channelized multicarrier transmitter system formed in accordance with an embodiment of the present invention.

FIG. 6 shows an alternative embodiment of system 100 where more than one ADC is required to convolve the signals down to base band, due to the size of the spectrum of interest. The bands are divided into 2 or more subgroups, where each subgroup has its own ADC the output of which is separately received by a DSP. In all other respects, this embodiment operates the same as the illustrative embodiment of FIG. 1.

In another embodiment, multiple antennas are provided with each having its own power splitter and signal modifier network tuned to a frequency band corresponding to the coverage for the particular antenna. A single power combiner sums all of the bands from the plurality of antenna networks together for processing by ADC 110. In all other respects, this embodiment operates the same as the illustrative embodiment of FIG. 1.

Reference has been made to several components throughout this disclosure as though each component is a unique component. One skilled in the art will readily recognize, however, that the various systems, engines, and controllers can be incorporated into one or more other systems, engines, and controllers thereby reducing the number of components. For example, look-up table 118, 218 can reside in controller 116, 208, respectively.

Reference may also have been made throughout this disclosure to "one embodiment," "an embodiment," or "embodiments" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

While the present invention has been particularly shown and described with reference to exemplary embodiments thereof, it should be understood by those of ordinary skill in the art that various changes, substitutions and alterations can be made herein without departing from the spirit and scope of the invention as embodied by the appended claims and their equivalents.

What is claimed is:

1. A circuit for individually processing multiple frequency bands in a composite RF signal, comprising:
    an antenna for receiving the composite RF signal;
    a power splitter connected to the antenna, the power splitter having an input node and a plurality of output nodes and configured to split an input signal into a plurality of output signals of substantially equal power;
    a plurality of signal modifiers each having an input node, an output node, and a control node, the input node of the signal modifier connected to one of the corresponding output nodes of the power splitter, wherein the signal modifiers are each configured to isolate a frequency band of interest without mixing and without down converting the composite RF signal;
    a power combiner having a plurality of input nodes and an output node, each one of the input nodes of the power combiner connected to the corresponding output node of one of the signal modifiers to produce a controlled composite RF signal at the output of the power combiner;
    an analog to digital converter ("ADC") connected to the power combiner and configured to convert the controlled composite RF signal into an output signal comprising a plurality of unambiguous individual base band signals by undersampling the controlled composite RF signal at a sampling frequency ("$F_S$"); and
    a controller responsive to the ADC to compare an amplitude for each of the plurality of unambiguous individual base band signals with a predefined value in order to provide a control signal to the control node of the signal modifier corresponding to the frequency band of interest, which frequency band of interest corresponds to one of the unambiguous base band signals, to substantially maintain a power level for the band of interest.

2. The circuit of claim 1, wherein $F_S$ is less than twice the bandwidth of the composite RF signal.

3. The circuit of claim 2, wherein $F_S$ is slightly more than twice the bandwidth of a sum of the unambiguous base band signals.

4. The circuit of claim 2, further comprising an aliasing engine having software operable thereon to generate a sampling frequency $F_S$ that is less than twice the bandwidth of the composite RF signal, wherein $F_S$ is calculated by iteratively incrementing a frequency F for a given set of frequency bands to convolve the given set of frequency bands to base band and test for ambiguity and fold over until a value for $F_S$ is found that down converts the frequency bands into the plurality of unambiguous individual base band signals.

5. The circuit of claim 2, further comprising an aliasing engine having software operable thereon to generate a sampling frequency $F_S$ that is less than twice the bandwidth of the composite RF signal.

6. The circuit of claim 1, wherein the controller performs a time-to-frequency domain conversion on the output signal of the ADC to identify a frequency component within the plurality of unambiguous individual base band signals of interest, and in response thereto sends a command signal to the signal modifier corresponding to the frequency band interest to modify the frequency band of interest.

7. The circuit of claim 6, further comprising a look-up table for identifying the appropriate signal modifier among the plurality of signal modifiers for modifying the frequency band on interest.

8. The circuit of claim 1, wherein the signal modifiers further comprise a first digital attenuator to reduce the gain of the composite RF signal followed by a filter to band-limit the RF signal to generate a band signal.

9. The circuit of claim 8, wherein the signal modifiers further comprise a second digital attenuator electrically connected to the filter to reduce the gain of the band signal and a second filter to further band-limit the band signal.

10. The circuit of claim 9, wherein the signal modifiers further comprise a third digital attenuator electrically connected to the second filter to reduce the gain of the band signal and a third filter to further band-limit the band signal.

11. The circuit of claim 10, wherein the first, second, and third digital attenuators are electrically connected to the controller to respond to the control signal to modify the band signal in response thereto.

12. The circuit of claim 11, wherein the first, second, and third digital attenuators are sequenced to modify the gain of the band signal in steps.

13. The circuit of claim 12, wherein the composite RF signal is split by the power splitter without any preconditioning and amplification.

14. A circuit for individually processing multiple frequency bands in a composite RF signal, comprising:
    a digital to analog converter ("DAC") configured to convert a digital signal having a plurality of individual band signals into a composite RF signal;
    a power splitter having an input node and a plurality of output nodes and configured to split the composite RF signal into a plurality of composite RF output signals of substantially equal power;

a plurality of signal modifiers each having an input node, an output node, and a control node, wherein the signal modifiers are each configured to receive at the input node the composite RF output signal and isolate a frequency band of interest within the composite RF output signal without mixing and without down converting the composite RF signal;

a transmitter amplifier having a plurality of input nodes and an output node, wherein the transmitter amplifier is configured to receive at the input node an output signal from each of the signal modifiers and combine each of the output signals corresponding to the frequency band of interest from each of the plurality of signal modifiers into a controlled composite RF signal;

an antenna combined to the output node of the transmitter amplifier and configured to transmit the controlled composite RF signal; and a controller to compare each of the plurality of individual band signals that are provided to the DAC with a corresponding predefined value and configured to provide a control signal to the control node of the signal modifier that corresponds to the individual band signal that exceeds the predefined value.

15. The circuit of claim 14, further comprising a look-up table for identifying the appropriate signal modifier among the plurality of signal modifiers for modifying the frequency band on interest.

16. The circuit of claim 15, wherein the signal modifiers further comprise a first digital attenuator to reduce the gain of the controlled composite RF signal followed by a filter to band-limit the controlled composite RF signal to generate a band signal.

17. The circuit of claim 16, wherein the signal modifiers further comprise a second digital attenuator electrically connected to the filter to reduce the gain of the band signal and a second filter to further band-limit the band signal.

18. The circuit of claim 17, wherein the signal modifiers further comprise a third digital attenuator electrically connected to the second filter to reduce the gain of the band signal and a third filter to further band-limit the band signal.

19. The circuit of claim 18, wherein the first, second, and third digital attenuators are electrically connected to the controller to respond to the control signal to modify the band signal in response thereto.

20. The circuit of claim 19, wherein the first, second, and third digital attenuators are sequenced to modify the gain of the band signal in steps.

* * * * *